United States Patent
Neibling et al.

[11] Patent Number: 5,921,633
[45] Date of Patent: Jul. 13, 1999

[54] WHEEL MOUNTING WITH ROTATABLE WHEEL FLANGE HAVING DIFFERENT PLANE ATTACHMENTS

[75] Inventors: Peter Neibling, Bad Kissingen; Heinrich Hofmann, Schweinfurt; Roland Langer, Schwanfeld; Rainer Breitenbach, Gochsheim, all of Germany

[73] Assignee: FAG Automobiltechnik AG, Germany

[21] Appl. No.: 08/718,158

[22] Filed: Sep. 19, 1996

[30]      Foreign Application Priority Data

Oct. 11, 1995 [DE] Germany .......................... 195 37 808

[51] Int. Cl.⁶ ................................................. B60B 27/00
[52] U.S. Cl. ........................ 301/6.1; 301/6.3; 301/105.1; 188/18 A; 188/218 XL
[58] Field of Search ................ 301/105.1, 124.1, 301/125, 126, 131, 6.1, 6.3, 6.8; 180/258, 259; 384/544; 464/178, 906; 188/18 A, 218 XL

[56]           References Cited

U.S. PATENT DOCUMENTS

| 2,970,008 | 1/1961 | Leach ............................. 301/35.62 X |
| 3,287,797 | 11/1966 | Wilcox et al. .................. 301/105.1 X |
| 4,046,433 | 9/1977 | Kiener ............................. 301/126 X |
| 4,381,874 | 5/1983 | Strader ........................... 301/126 X |
| 4,662,482 | 5/1987 | Bass ................................... 301/6.8 X |
| 4,699,433 | 10/1987 | Kopp ............................... 301/105.1 X |
| 4,821,848 | 4/1989 | Izumine ........................... 188/218 X |
| 5,520,269 | 5/1996 | Yamamoto et al. ............. 188/218 X |

FOREIGN PATENT DOCUMENTS

| 24559 | 3/1981 | European Pat. Off. .......... 301/105.1 |
| 2505081 | 8/1976 | Germany . |
| 3115740 | 4/1982 | Germany . |
| 3409837 | 11/1984 | Germany ........................... 301/105.1 |
| 3816415 | 11/1989 | Germany . |

OTHER PUBLICATIONS

Publ. No. 05119 EA, "Motor Vehicle Wheel Bearing Mountings", FAG Kugelfischer Georg Schäfer KGaA Sep. 1996.

*Primary Examiner*—Russell D. Stormer
*Attorney, Agent, or Firm*—Ostrolenk, Faber, Gerb & Soffen, LLP

[57]                ABSTRACT

A wheel mounting for a vehicle, which includes a rotatable wheel flange connected by an antifriction bearing with a stationary part of the wheel mounting. The wheel flange has pluralities of first and second mounting regions circumferentially around the wheel flange and axially spaced at different respective first and second axial locations along the wheel flange. Each of the regions includes fastening areas to which either a brake disk or a wheel rim may be attached. Rivets, pins, or the like may permit axial mounting of the brake disk with play. Radially inwardly facing, generally semicircular holes in the brake disk enable the brake disk to expand without interference.

22 Claims, 5 Drawing Sheets

WHEEL MOUNTING WITH ROTATABLE WHEEL FLANGE HAVING DIFFERENT PLANE ATTACHMENTS

BACKGROUND OF THE INVENTION

The present invention relates to a wheel mounting for a motor vehicle having a wheel flange including mounting regions for a brake disk or a wheel rim.

Motor vehicle wheel mountings of this type are known, for instance, from the assignee's brochure, Publication No. WL 05119 DA, a copy of which is being filed with this application. Antifriction bearings are installed on a rotatable wheel flange on which the wheel rim and/or the brake disk is fastened. In many cases, the wheel flange is also integrated in one ring of the antifriction bearings. Current wheel mountings commonly have a pot-shaped development of the brake disk which is screwed on the wheel flange and which surrounds the mounting. (See, for instance, Federal Republic of Germany 38 16 415 A1, 31 15 740 C2 or AS 25 05 081).

French Patent 29 39 902 also discloses a wheel mounting in which the wheel rim is fastened on one side of the rotatable wheel flange and the brake disk is fastened on the other side. Although the brake disk is of somewhat simpler development, its pot shape is still present. For reasons of manufacture and expense, use of a flat brake disk would be desirable.

In many cases a "floating" brake disk, i.e., one that is not rigidly arranged, is also desirable in order to be able to equalize the wear of the brake lining. Finally, sufficient ventilation of the brake disk must also be assured to be able to discharge the heat of friction produced upon braking.

SUMMARY OF THE INVENTION

Objects of the present invention are to develop a wheel mounting of the aforementioned type so that it permits a simple development of the brake disk, including a floating mounting thereof, and assures sufficient exposure of the brake to air, takes up little space and is of light weight.

The invention concerns a wheel mounting for a vehicle, which includes a rotatable wheel flange connected by an antifriction bearing with a stationary part of the wheel mounting. The wheel flange has pluralities of first and second mounting regions circumferentially around the wheel flange and axially spaced at different respective first and second axial locations along the wheel flange. Each of the regions includes fastening areas to which either a brake disk or a wheel rim may be attached. Rivets, pins, or the like may permit axial mounting of the brake disk with play. Radially inwardly facing, generally semicircular holes in the brake disk enable the brake disk to expand without interference with the expansion by the brake disk.

The wheel flange of the wheel mounting includes two fastening planes which are offset axially along the wheel flange and are parallel to each other. Sections of the wheel flange in different planes alternate circumferentially around the wheel flange. Each fastening plane permits attachment of a brake disk and/or a wheel rim. This enables a flat construction of the brake disk. The development of the wheel flange as a forging (or when it is made of light metal, as a casting or a die casting) permits inexpensive construction of the wheel mounting.

Other objects, features and advantages of the present invention will become apparent from the following description of embodiments of the invention which refers to the accompanying drawings.

DETAILED DESCRIPTION OF THE PREFERRED EMBODIMENTS

Figure 1:
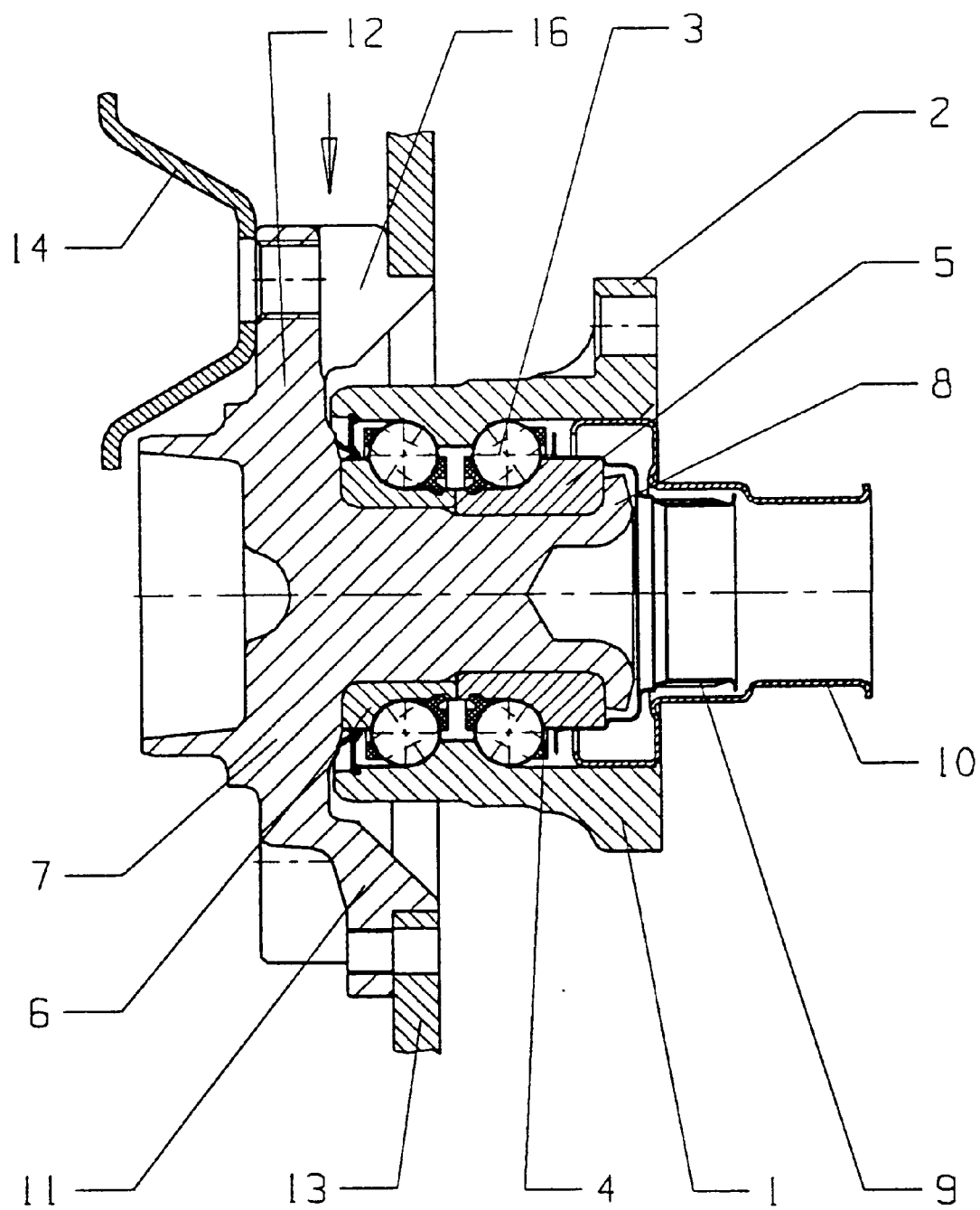
FIG. 1 is a cross section through a wheel mounting in accordance with one embodiment of the invention.

FIG. 1 shows a double row antifriction bearing. It includes a single piece bearing outer ring 1. The outer ring 1 has an integrated flange 2 by which the wheel mounting is fastened to a vehicle [not shown].

The bearing includes two annular rows of bearing balls 3 which are held by separators or cages 4. The balls rest via two respective inner rings 5 and 6 on the rotatable wheel flange 7. The inner rings 5 and 6 are axially secured in a form locked manner by a plastically deformed, radially outwardly projecting collar 8 on the wheel flange 7. In a preferred form, the wheel flange is produced as a forging.

For detecting the speed of rotation of the flange 7, for instance for anti-lock braking control, a pulse transmitting bushing 9 rotates with the inner ring 5. A sensor housing 10 receives a sensor and is arranged stationary on the outer ring 2. It senses the pulses of the bushing 9 to determine rotation speed.

Figure 2:
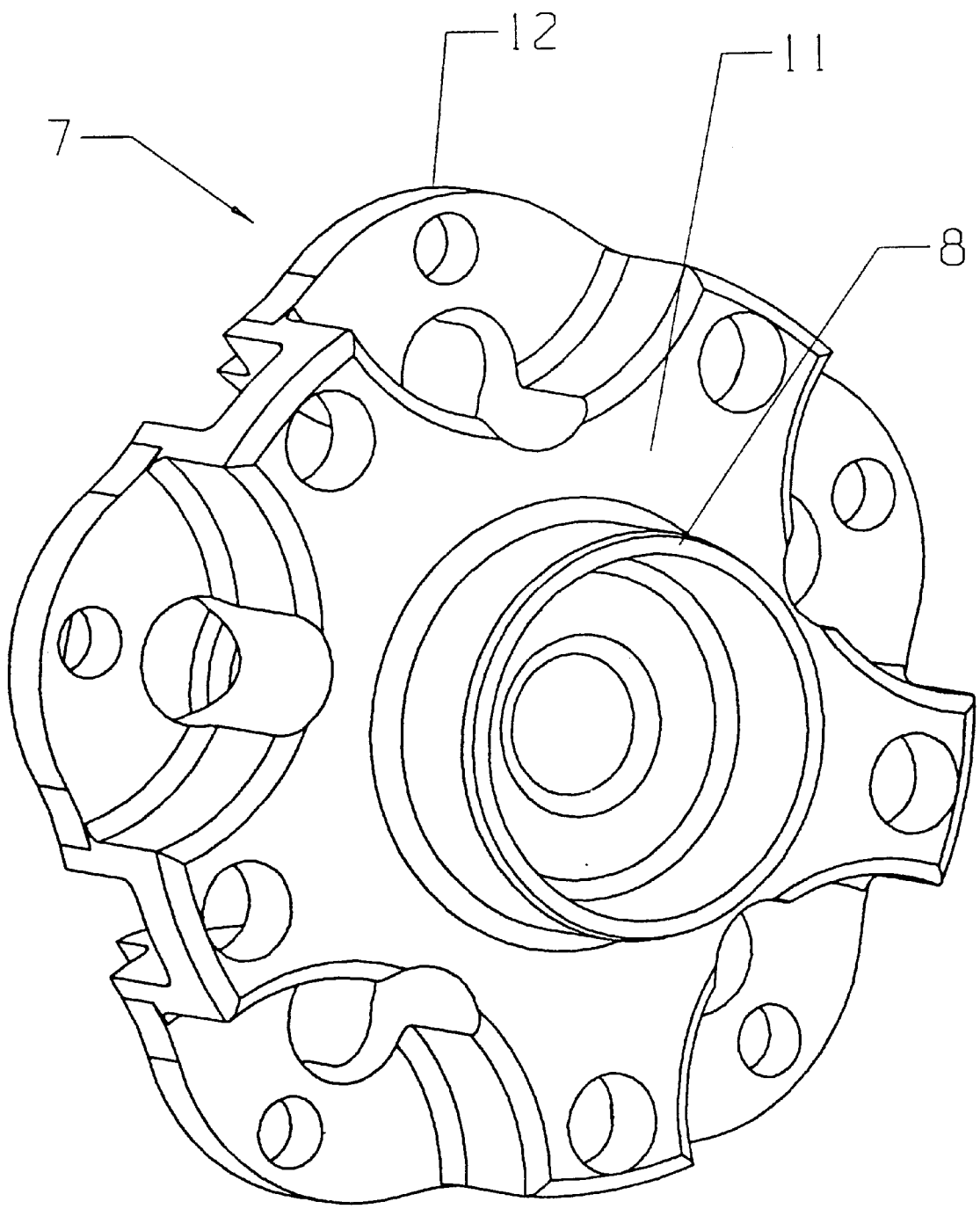
FIG. 2 is a perspective view of a wheel flange with axially offset regions around its circumference.

The wheel flange 7 is developed, e.g., by pressing the flange, such that it has two sets of fastening regions 11 and 12, which are axially offset from and parallel to each other. As can be seen in FIG. 2, these regions 11 and 12 alternate in the circumferential direction. Each region presents a possibility for fastening either a brake disk 13 and/or a wheel rim 14. The brake disk 13 fastened thereon can thus be developed as a simple flat part, if desired.

Figure 3:
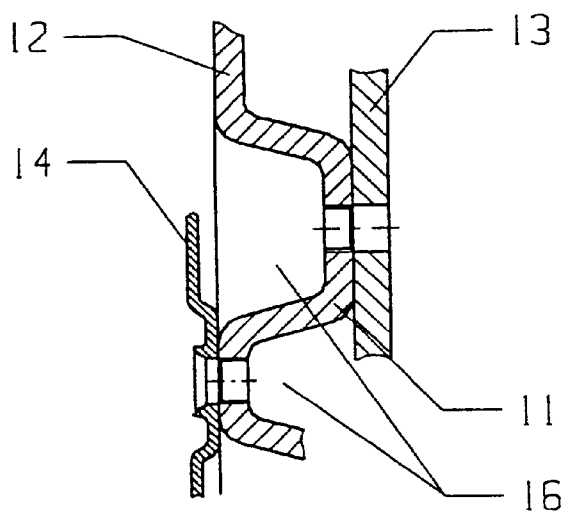
FIG. 3 shows a portion of a top view of a wheel flange, seen in the direction of the arrow in FIG. 1.

As can be noted from FIGS. 2 and 3, the multi-lobed or star-shaped development and also the varying axial locations development of the wheel flange 7 produces free spaces 16 spaced around the flange. These serve advantageously for cooling the brake disk and for radiating heat, in part due to the enlargement of the surface area exposed to air.

Figure 4:
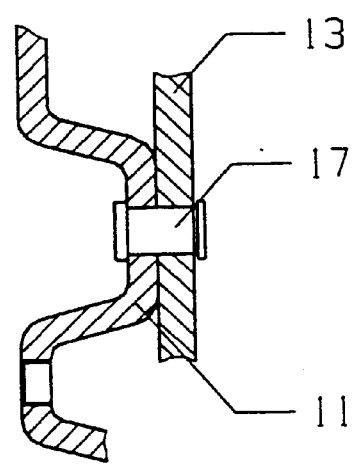
FIG. 4 shows a portion of a top view of a wheel flange, also seen in the direction of the arrow in FIG. 1, of a variant with a floating arrangement of the brake disk.

In the variant shown in FIG. 4, the brake disk 13 is fastened with play in the region 11 of the wheel flange 7. A rivet 17, for instance, can be provided for this purpose. The rivet head spacing is greater than the thickness of the brake disk 13 for attaching the brake disk 13 in floating manner, which can equalize the wear of the brake lining. The devices for fastening the brake disk to the wheel flange may be one selected from the group consisting of rivets, pins or even threaded bolts for which the receiving holes in the flange regions must be correspondingly threaded.

Figure 5:
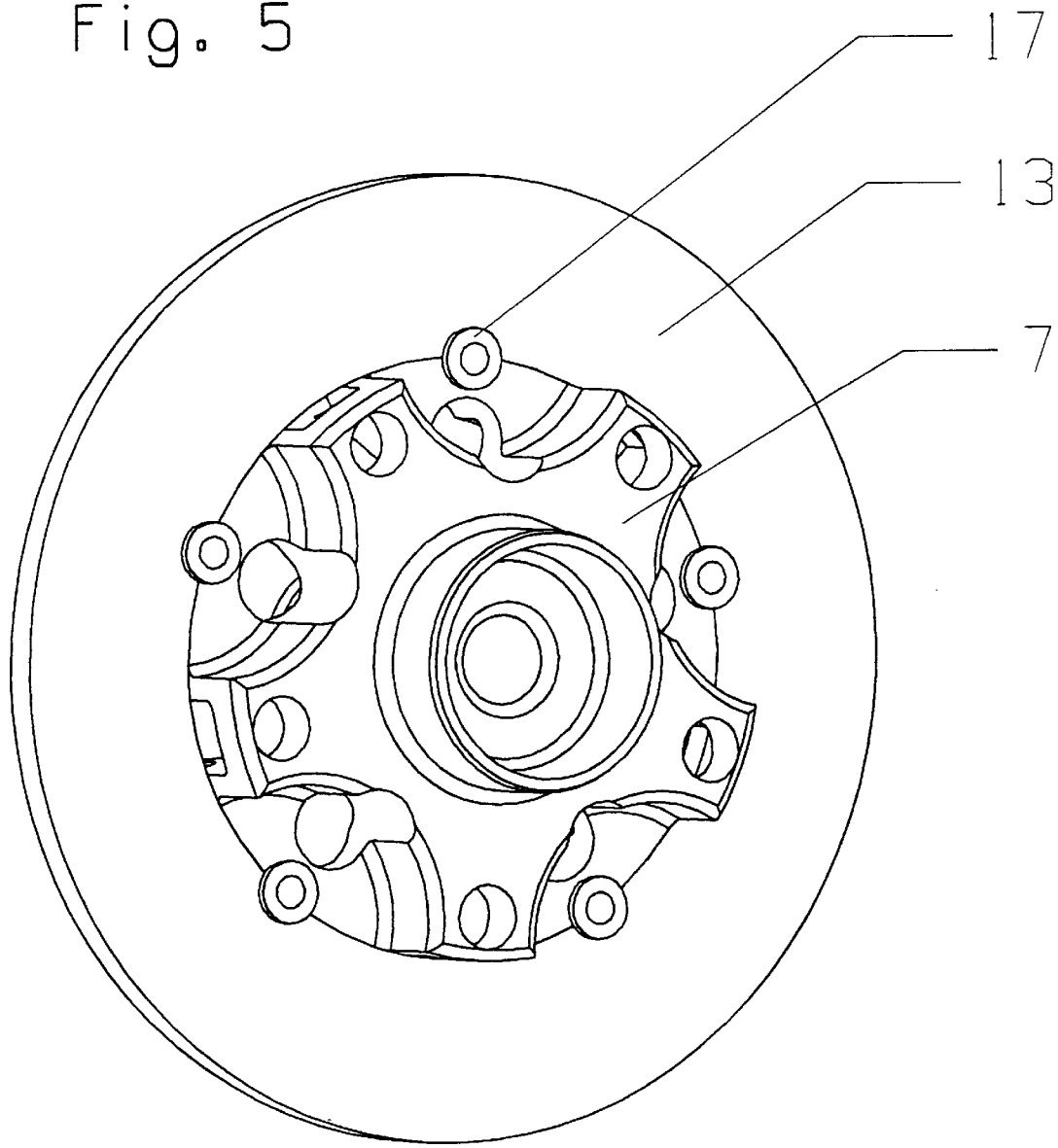
FIG. 5 is a perspective view of a wheel flange with a brake disk in a variant with an axially floating arrangement of the brake disk and which permits radial expandability of the disk.

In a further variant shown in FIG. 5, the brake disk 13 is not only fastened floating with axial play on the wheel flange, it is also fastened radially with play enabling radial expandability, for instance upon heating during operation. For permitting expansion, the receiving holes for the rivets 17 are developed as semi-circular half holes, which open toward the inside for permitting radial expansion and contraction while enabling transmission of the braking force in the circumferential direction.

Figure 6:
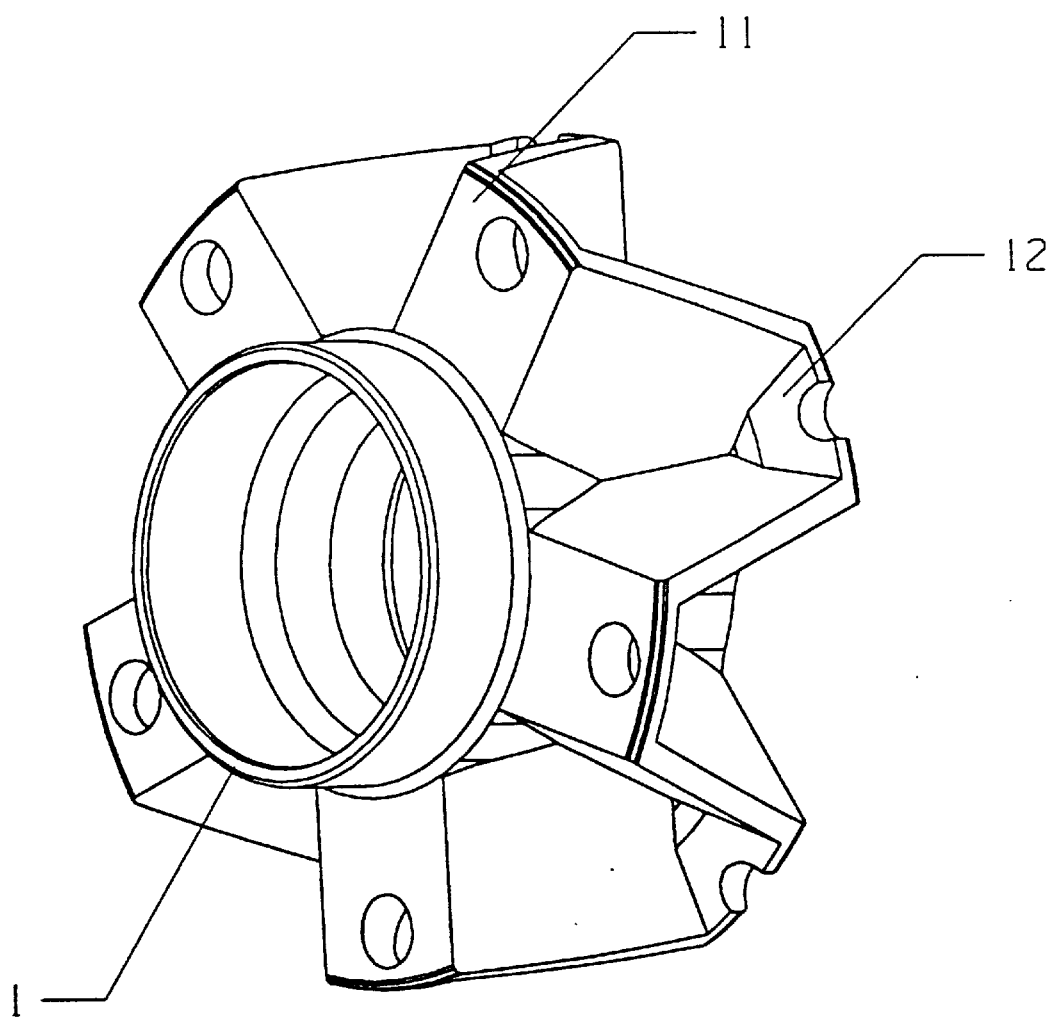
FIG. 6 is a perspective view of a wheel flange which is integrated with the bearing outer ring, in a second generation design.

In the embodiment shown in FIG. 6, the fastening sections 11 and 12 are also arranged alternately around the circumferential direction but are integrated with the bearing outer ring 1 in a second generation design, rather than being separate elements from the outer ring.

The invention is not limited to the wheel mounting shown. For example, instead of a double row ball bearing, two tapered roller bearings may be used or wheel bearings of a third and fourth generation may be employed. In this connection, and depending on the specific use, the wheel flange may also be arranged on the outer ring.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel mounting for a vehicle, the wheel mounting including:
   a first part connectable to the vehicle;
   a wheel flange rotatable with respect to the first part;
   an antifriction bearing between the first part and the wheel flange, so that the wheel flange can rotate with reference to the first part, the wheel flange being connected with and rotatable on the bearing, the wheel flange having a rotation axis;
   a plurality of first and second regions disposed alternately around the circumference of the wheel flange, the first and second regions being located in respective first and second planes, the planes being axially offset such that adjacent first and second regions are axially offset with reference to each other along the rotation axis of the wheel flange, each of the first and second axially-offset regions including respective fastenings for attachment of one of a wheel rim or a brake disk to the wheel flange, the regions being axially offset such that openings are developed around the circumference of the wheel flange between the first and second planes and between at least one of successive first regions or successive second regions.

2. The wheel mounting of claim 1, wherein there are respective first and second pluralities of each of the first and second regions, and the first and second regions alternate around the circumference of the wheel flange.

3. The wheel mounting of claim 2, wherein the first and second regions project generally radially and are generally parallel to each other.

4. The wheel mounting of claim 3, wherein the wheel flange generally has a meander shape which also shifts axially from one of the regions to the adjacent region, alternating around the circumference of the wheel flange.

5. The wheel mounting of claim 3, wherein the wheel flange has a periphery around the regions shaped so that the wheel flange generally is developed in a star shape.

6. The wheel mounting of claim 2, wherein the axially offset first and second regions are formed by pressing the flange.

7. The wheel mounting of claim 2, wherein the fastenings to the flange regions comprise holes defined in the flange regions.

8. The wheel mounting of claim 7, wherein the fastenings further comprise fastening elements selected from the group consisting of threaded bolts, rivets and pins which are insertable into the holes in the flange regions.

9. The wheel mounting of claim 1, wherein the fastenings further comprise fastening elements selected from the group consisting of threaded bolts, rivets and pins.

10. The wheel mounting of claim 2, wherein the wheel flange is developed as a forging.

11. The wheel mounting of claim 2, wherein the antifriction bearing comprises a double row bearing with a bearing inner ring on the wheel flange.

12. The wheel mounting of claim 11, wherein the antifriction bearing comprises a double row ball bearing.

13. The wheel mounting of claim 11, further comprising a shoulder formed on the wheel flange for providing form locked attachment of the inner ring on the wheel flange.

14. The wheel mounting of claim 2, further comprising a brake disk fastened in a floating manner on one of the first and second pluralities of regions of the wheel flange.

15. The wheel mounting of claim 2, wherein the brake disk is so fastened on one of the first and second pluralities of regions of the wheel flange as to permit axial play of the brake disk.

16. The wheel mounting of claim 15, wherein the brake disk is fastened on the wheel flange by rivets.

17. The wheel mounting of claim 14, wherein the brake disk is fastened on the wheel flange in a manner permitting radial expansion of the brake disk.

18. The wheel mounting of claim 17, wherein the brake disk includes generally semicircularly shaped receiving holes which open radially inwardly;
   the fastenings passing through the receiving holes and into the respective flange regions for mounting the brake disc for permitting expansion of the brake disc with reference to the flange.

19. The wheel mounting of claim 18, wherein the fastenings passing through the receiving holes further comprise fastening elements selected from the group consisting of threaded bolts, rivets and pins which are insertable into the flange regions.

20. The wheel mounting of claim 1, wherein the wheel flange generally has a meander shape which also shifts axially from one of the regions to the adjacent region, alternating around the circumference of the wheel flange.

21. The wheel mounting of claim 14, wherein the brake disk is flat.

22. The wheel mounting of claim 14, wherein at least some of the openings communicate between both sides of the mounted brake disk.

* * * * *